March 4, 1952 F. PERWOLF 2,588,286

CARD INDEX

Filed March 5, 1947 2 SHEETS—SHEET 1

Initial letter.......... a/1-5 E = a/1,2,4
Number.................... a/6-9 15 = a/9
Yer of birth a/10,11, b/1,b/2; 1910 = a/11,b/1
male.......................... b/3

INVENTOR
Felix Perwolf

BY

ATTORNEY

March 4, 1952 F. PERWOLF 2,588,286
CARD INDEX
Filed March 5, 1947 2 SHEETS—SHEET 2
Fig. 3
Code
to find out the markings.
| 1 Initial | 2 № | 3 Year | 4 Sex | Code ciphers to 1 | 2 | 3 | 4 |
|---|---|---|---|---|---|---|---|
| a | 1 | - | - | a/1 | a/6 | a | [b/3] |
| b | 2 | 1901 | - | 1,2 | 6,7 | 10 | |
| c | 3 | 1902 | - | 1,2,3 | 6,7,8 | 10,11 | |
| d | 4 | 1903 | - | 1,2,3,4 | 6,7,8,9 | 10,11,b/1 | |
| [e] | 5 | 1904 | - | [1,2,4] | 6,7,9 | 10,11,b/1,b/2 | |
| f | 6 | 1905 | [male] | 1,3 | 6,8 | 10,11,b/2 | |
| g | 7 | 1906 | | 1,3,4 | 6,8,9 | 10,b/1 | |
| h | 8 | 1907 | | 1,4 | 6,9 | 10,b/1,b/2 | |
| i | 9 | 1908 | | 2 | 7 | 10,b/2 | |
| j | 10 | 1909 | | 2,3 | 7,8 | 11 | |
| k | 11 | [1910] | | 2,3,4 | 7,8,9 | [11,b/1] | |
| l | 12 | 1911 | | 2,4 | 7,9 | 11,b/1,b/2 | |
| m | 13 | 1912 | | 3 | 8 | 11,b/2 | |
| n | 14 | 1913 | | 3,4 | 8,9 | b/1 | |
| o | [15] | 1914 | | 4 | [9] | b/1,b/2 | |
| p | | | | 1,2,3,4,5 | | | |
| q | | | | 1,2,3,5 | | | |
| r | | | | 1,2,4,5 | | | |
| s | | | | 1,3,4,5 | | | |
| t | | | | 1,2,5 | | | |
| u | | | | 1,4,5 | | | |
| v | | | | 1,5 | | | |
| w | | | | 2,5 | | | |
| x | | | | 3,5 | | | |
| y | | | | 4,5 | | | |
| z | | | | 5 | | | |
| Number of Elements | 1 | 2 | 3 | 4 | 5 | 6 | 7 | 8 | 9 | 10 | 20 |
|---|---|---|---|---|---|---|---|---|---|---|---|
| Possible Combinations | 1 | 3 | 7 | 15 | 31 | 63 | 127 | 255 | 511 | 1023 | 1,048,575 |
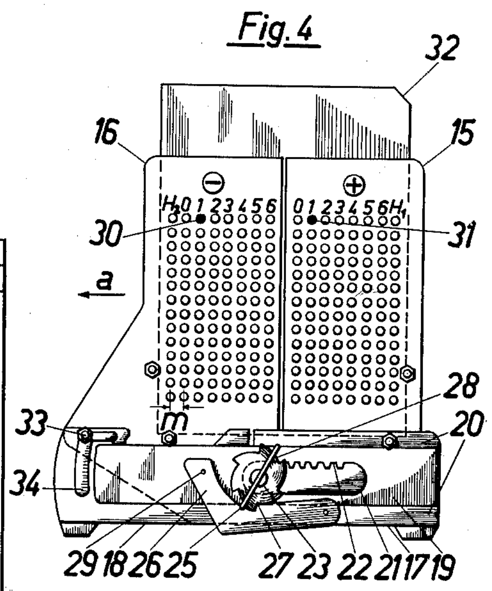
Fig. 4
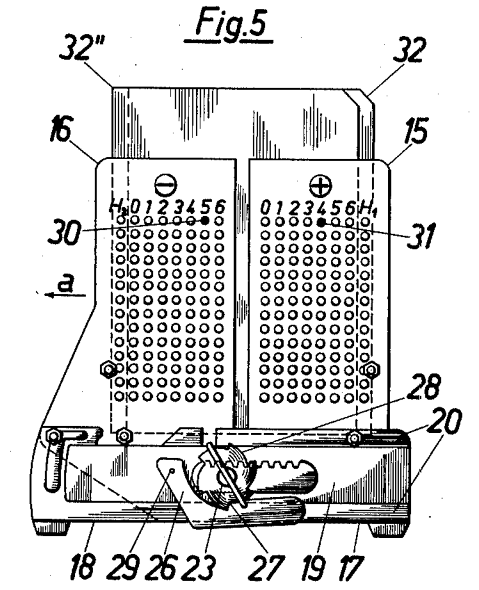
Fig. 5
INVENTOR
Felix Perwolf
BY [signature]
ATTORNEY Patented Mar. 4, 1952 2,588,286

UNITED STATES PATENT OFFICE 2,588,286

CARD INDEX

Felix Perwolf, Vienna, Austria, assignor to Sortex A. G., Zurich, Switzerland

Application March 5, 1947, Serial No. 732,638
In Germany January 7, 1942

6 Claims. (Cl. 129—16.1)

This invention relates to a device for the selection of index cards by means of selector rods, in which device the cards have markings in two groups, consisting of a selection group and a control group, said markings consisting of a number of pairs of holes, one hole of each pair belonging to the selection group and the other to the control group, and one hole of each pair being extended outwardly to form a slot.

A feature of the invention is the particular form of the card index box, which has a device for facilitating the shifting out of the cards for the purpose of separating the pertinent, or selected cards from those not pertinent or selected.

Another feature of the invention resides in the form of the card index box, which is such that several mechanical selection steps can be performed in immediate succession, one after the other, without the need of removing from the device after each step the cards which have been newly separated in said step as not being pertinent from the pertinent index cards.

The invention is explained with reference to the accompanying drawings, which represent certain embodiments by way of example and in which Fig. 1 shows an embodiment of a card index box;

Fig. 3 shows a code for the markings of the index card according to Fig. 2;

Fig. 4 shows, in a front view, another embodiment of a card index box in a position of rest, with the selector rods inserted for the first selection step;

Fig. 5 shows, in a front view, the box shown in Fig. 4, but after the first selection step, the rods being introduced into the manipulation columns.

Figures 1, 2, 6:
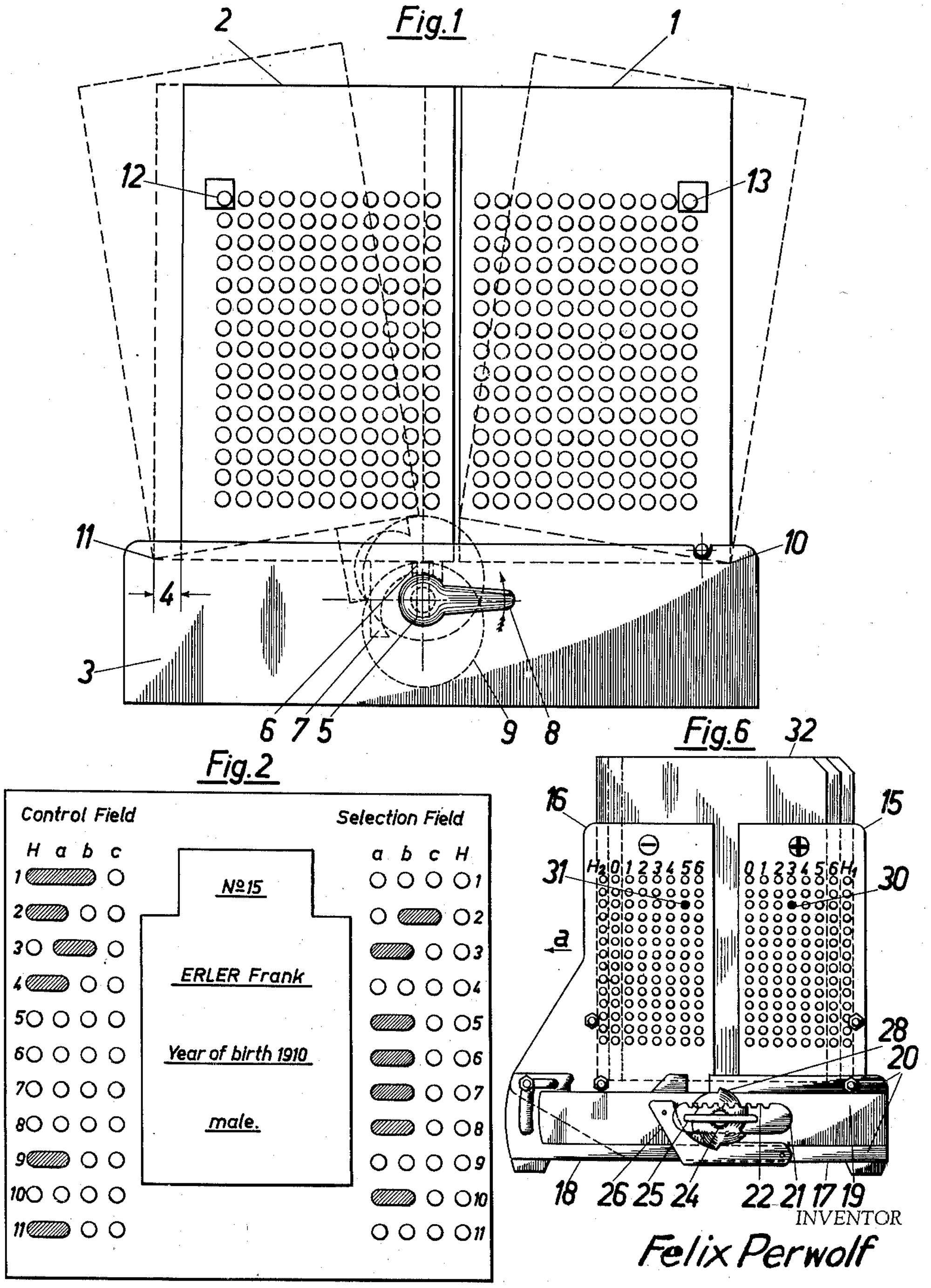
Fig. 2 shows in a front view an index card to be used in this card index box.
Fig. 6 shows the same device after the second selection step, with the rods in the manipulation columns.

The card index box shown in Fig. 1 represents a preferred embodiment of the invention. The card index box is divided into two halves 1 and 2, each of which is equally provided with a group of holes and which rest in a common base 3. The part 2 is laterally displaceable in the base 3 by the distance 4. This displacement is effected by a shaft 5, having a catch pin 6, and an abutment 7 fixed to the part 2 and projecting into the orbit of the catch pin (Fig.1). By a turning of the handle 8 in the sense of the arrow, the box half 1 first remains in the position shown, whereas the box half 2 is first moved to the left until it abuts the side wall of the base 3. Thereby the cards are carried along, as will be described in detail hereinafter, by a rod inserted into the hole field of each half, and are separated to form two packs of cards displaced relative to each other by the distance 4. Thus between the parts 1 and 2 there is formed a gap the width of which equals the distance between two neighboring holes.

When the handle 8 is turned further, one or more eccentrics 9, fixedly arranged on the shaft 5, become effective in lifting the two parts 1, 2 and tilting these parts, which rest on their corner edges 10, 11 (dotted line position).

As shown in Fig. 2, the card forms used in the card index box are provided with groups of holes which are arranged on both sides of a line of symmetry and which, moreover, are in perfect register with the groups of holes on the box halves. One field, in the present case that lying to the right of the line of symmetry, constitutes the so-called selection field, the other one the control field. The center line extending on each card between the selection and control fields from top to bottom is preferably chosen as the line of symmetry for the two sets of holes. Moreover, an inscription field is provided, preferably in the central part of the card, or in another suitable part thereof. The size of the hole fields and of the inscription field may be chosen freely, depending upon the requirements in each case.

Each hole in the selection field is associated with the similarly situated hole in the control field. A specific feature is coordinated with each of these pairs of holes. This feature is composed of the designations of the vertical column (letters *a*, *b*, *c* in Fig. 2) and of the horizontal row (numerals 1 to 11 in Fig. 2). These features serve for facilitating the location of a pair of holes on the card and on the hole fields of the box halves 1, 2. The column of holes farthest to the right in the right-hand field and the column of holes farthest to the left in the left-hand field, both columns being designated by H, serve as manipulation columns, as will also be described hereinafter. Each pair of holes can be used for selection either individually or in any desired combination with other pairs of holes. Each combination possible can be coordinated with a specific significance, which is listed in a separate code (Fig. 3). The number of possibilities depends on the number of pairs of holes used and can be readily calculated on the rules of mathematic combinations, e. g., four pairs of holes give 16, five pairs of holes 32 possibilities, whereas where twice eleven pairs of holes are used, e. g., columns *a*, *b*, there are four million possibilities. In the example shown, eleven more pairs of holes (column *c*) are provided for additional features.

The marking and slotting of such card will be briefly described hereinafter with reference to the card shown in Fig. 2. In the first place, the several pairs of holes are grouped in sets of specific significance, according to the organization plan. The pairs of holes *a*/1 to *a*/5, e. g., serve for selection by the initial letter, the pairs of holes *a*/6 to *a*/9 for the account numbers, the pairs of holes *a*/10 to *b*/2 for the year of birth of the owner of the account, whereas *b*/3 designates the sex. The other sets of holes are not used in this example.

The name in the example (Erler) beginning with "E," the combination to be used for marking is *a*/1, 2, 4, according to the code prepared. Therefore, the pairs of holes found in the code are to be marked on the card. The number 15 has the combination *a*/9; therefore, the hole 9 of column *a* is to be marked. The code provides the combination *a*/11, *b*/1 for the year 1910, so that in addition the hole 11 of column *a* and the hole 1 of column *b* are to be marked. Since the member is male, the hole 3 of column *b* is to be marked too, on that account.

Subsequently the slotting is to be performed as follows: In the control field from each hole marked as far as the adjacent auxiliary column on the left, hence, from *a*/1, *a*/2, *a*/9, and *a*/11, in each case as far as column H, and from *b*/1 and *b*/3 to *a*, being the auxiliary column for column *b*.

In the selection field everything is slotted, with the exception of one field to the right of each hole marked, that is, in the 1st, 2nd, 4th, 9th and 11th horizontal rows the lands between the holes of the columns *a* and *b*, and in the first and third horizontal rows the lands between the columns *b* and *c*. Beginning with the fourth row the field is not used any more, all slottings from *b* to H being dispensed with here. The holes *b* in the first to third rows have the column *c*, and the holes *a* in the third to eleventh horizontal rows the column *b* as their auxiliary column.

The selection of cards with the device according to the invention, shown in Fig. 1, is effected as follows:

The cards are inserted into the box 1, 2 without any definite order. Of two selector rods, which are of a length equal to that of the box, one is introduced into the selection field and the other into the control field, into the holes which correspond to the feature to be selected, and passed through all cards. Now the handle 8 is turned in the sense of the arrow by approximately 90°. On the assumption that, e. g., all cards with the year-of-birth entry 1910 are to be selected, the following process is effected: According to the group plan the year-of-birth entry 1910 has coordinated with it the combination *a*/11, *b*/1. Hence, all cards slotted in the fields of holes for both combination features must be selected. For this purpose the selector rods are first introduced into the holes *a*/11 of both halves 1, 2, and then the latter are moved apart by the turning of the handle. Because in each card form provided with the combination feature *a*/11, a land has been left in the selection field from the corresponding hole *a*/11 to the right, whereas in the control field a slot has been cut as far as the next hole to the left, all cards with the feature *a*/11 are held fast by the selector rod entered into the selection field and the appertaining box half, whereas all other cards are displaced to the left with the other box half, by the distance 4. As the handle is turned farther, both box halves with the cards held fast therein are slightly moved pivotally towards the outside, for better separation. In the right-hand box half there are now all the cards selected, that is, in the example chosen, all cards provided with the combination feature *a*/11, whereas in the left-hand box half there are all other cards, which are not provided with this feature. The latter cards being without significance for the subsequent selection, they are removed from the box, in which only cards with the combination feature *a*/11 remain. By turning the handle 8 back to its initial position, the cards remaining in the box are also moved into their initial position. The device is ready for a new selection step, which is carried out for the second combination feature, in our case *b*/1, exactly as has been described hereinbefore, by sticking the selector rods into the holes designated by *b*/1 and turning the handle all round. After this step the right-hand box half contains only those cards designated by *a*/11 which also have the combination feature *b*/1, that is, the cards with the year-of-birth entry 1910 whereas all cards having the feature *a*/11 alone or in combination with a feature other than *b*/1, that is, the cards having a year-of-birth entry other than 1910, have been moved to the left with the left-hand box half. The card packs, which have thus been separated and shifted apart, can be removed from the box individually for further evaluation. When the cards are no longer used they are returned into the box without any definite order, care being taken only that the card fields agree with the fields on the front walls of the box halves.

In working with the selector device described, the selection of features provided only on a few cards out of a single filling of the device, comprising, e. g., 500 or more index cards, requires that two, three or more selection steps be carried out in such a manner that after each selection step the pack of non-pertinent cards is removed out of the box so that in the most unfavorable case, e. g., where there is only one result card among 500 cards, several selection steps are required for the removal of 499 cards until the one card, constituting the result, remains in the box alone.

The selector device shown in Figs. 4, 5 and 6 enables the performance of several mechanical selection steps in immediate succession, without necessitating after each step the removal of the non-pertinent index cards, separated from the pertinent ones, out of the device. This feature also enables the cards to remain always in their original order. The result of two or several selection steps performed in immediate succession always remains optically visible and physically perceivable. Hence, the cards constituting the result of selection can be removed from the device at any time, if desired, without the original order of said cards, or the original order of the cards remaining in the device being destroyed.

The box designed for receiving the index cards consists of two halves 15 and 16 with bases 17 and 18. On the base 18 there is fixed a rail 19, which slides between guides 20 of the base 17 during the movement of the two box halves relative to each other, and which has a longitudinal slot 21 having a toothed upper boundary 22. This toothing 22 is in mesh with a pinion 24 disposed on a shaft 23, which is journalled in the base 17. The turning of the shaft 23 is effected step-by-step by means of a handle 25 and amounts in each case to an angle which corresponds to the displacement of the box portion 18 by a hole pitch *m* (Fig. 4) in the direction of the arrow *a*. The locking of the part 18 is effected by means of a locking pawl 26 and a ratchet wheel 28 also fitted on the shaft 23. The pawl 26, which is constantly urged against the ratchet wheel by a spring (not shown), has fixed to it a detent 27, which after each advancing step of the handle interlocks with the respective notch provided on the circumference of the ratchet wheel, whereby the handle is locked. The pitch between two successive notches on the ratchet wheel 28, and the receptive angular motion of the shaft, correspond to the displacement of the movable box 16, 18 by one hole pitch *m*. The locking pawl 26 has a handle 29 for moving the pawl off, and out of engagement from, the ratchet 28. A similar arrangement, but without ratchet wheel and locking pawl, is provided on the rear of the device.

With the device described the selection procedure is performed as follows: The cards, in the order desired, are inserted into the several compartments of the box, which are arranged one after the other. The selector rods being pulled out, the device is ready for selection. On the assumption that the desired feature of the cards to be sorted out is designated by the perforations 1/0, 4/0, and 3/2, the first number always referring to the column, the second to the row, three selection steps are required. In the first step the two selector rods 30, 31 are stuck into the holes designated by 1, of the row 0, both in the selection and control fields, and subsequently the handle 25 is turned until the detent engages with the next tooth of the ratchet wheel, that is, by one tooth pitch of the ratchet wheel 26, in the direction of the arrow *b*, whereby the box part 16, 18, owing to the meshing of the gear 23 with the toothing 22, is separated from the part 15 by one hold pitch *m* so that a gap of the width *m* is formed between the two box halves. Thereby the first bi-partition of the cards inserted has been effected. The left-hand card pack 32'' sorted out is left in the box (Fig. 5) and the second selection step initiated. For this purpose the rod 31 is stuck into the right-hand or selection field, into the hole designated with 4, and the second rod into the hole 5 of the row 0, which hole 5 lies farther inwardly by one hole pitch. Thereby the distance between the two rods is again equal to that between two corresponding holes in the position of rest of the device. As the handle 25 is turned farther by one tooth pitch of the ratchet wheel, another bipartition is effected. The non-pertinent cards sorted out are again left in the box together with the pertinent ones but are again displaced relative to the latter by the distance *m* to the left. For the third selection step the rods are now stuck into the holes 3 of the row 2 in the selection field and 5 in the control field of the same row. This is necessary because owing to the displacement of the index card box part 16, 18 out of its position of rest by twice the hole pitch *m*, the rod 31 must, in the control field, be stuck by two holes farther to the right, in the horizontal direction, than the control field hole having the same designation as the hole in the selection field. After the handle has again been turned in the sense of the arrow *b*, the third selection step has been completed.

If it is desired, after the second selection step, to separate the pertinent cards completely from the non-pertinent ones, by tilting the two halves of the box relative to each other, the rod 31 is inserted into a hole of the column of holes at the right-hand edge of the card (manipulation column $H_1$), and the other into a hole of the column of holes lying by one hole pitch toward the center from the column of holes $H_2$, which lies farther to the left. This displacement of the left-hand manipulation column results from the displacement of the box part 16 by twice the hole pitch to the left. Hence, the distance of the two manipulation columns always remains the same.

The tilting operation is effected in this case by holding the left-hand box half 16 with the hand and pivotally moving it outwardly to the left, the left-hand box part being guided and supported by the bolt 33 fixed to said box part and guided in an oblong hole 34.

I claim:

1. A card index apparatus comprising a container for the index cards and including two halves of substantially equal size, a base supporting said halves, symmetrical groups of holes through the front and rear walls of said halves and arranged at right angles to the separating line of the halves and at equal distances from one another, means for imparting a rectilinear movement away of at least one-half from the other half and at right angles to the plane of division, and means for tilting at least one of said halves about its lower edge, for the purpose of performing the selection procedure.

2. Apparatus as defined in claim 1 wherein said shifting means comprises a rack arranged on one of said halves, a rotatable spindle journalled in the other of said halves, and a pinion mounted on said spindle and in mesh with said rack.

3. Apparatus as defined in claim 2 wherein a ratchet wheel is mounted on said spindle, a lock pawl is adapted to engage said ratchet wheel and to lock the shiftable part of the card index box in the successive selection positions, the pitch of two consecutive teeth of the said ratchet wheel and the corresponding angle of rotation of said spindle corresponding to the shifting of the movable half by the distance of one hole.

4. Apparatus as defined in claim 1 wherein said moving and tilting means comprises a single operating element on the front of the base, said operating element effecting the rectilinear movement apart as well as the tilting movement and the return movement into the original initial position of the halves.

5. Apparatus as defined in claim 1 wherein each of both groups of holes in the two halves includes an outer row of holes, and separator rods adapted to remain permanently with the box and to be inserted into or withdrawn from the holes of said outer rows.

6. Apparatus as defined in claim 1, comprising means for locking the halves in their position to one another at distances which, in succession, are equal to the distance of adjacent holes lying side by side in the direction of motion.

FELIX PERWOLF.

REFERENCES CITED

The following references are of record in the file of this patent:

UNITED STATES PATENTS

| Number | Name | Date |
|---|---|---|
| 874,571 | Crampton | Dec. 24, 1907 |
| 999,991 | Hargrave | Aug. 8, 1911 |
| 1,404,611 | Hoag | Jan. 24, 1922 |
| 1,812,350 | Lingwood | June 30, 1931 |
| 2,359,705 | Zalkind | Oct. 3, 1944 |
| 2,415,891 | Knauss | Feb. 28, 1947 |
| 2,424,053 | Rembold | July 15, 1947 |

FOREIGN PATENTS

| Number | Country | Date |
|---|---|---|
| 49,600 | France | Jan. 28, 1939 |
| 508,589 | Great Britain | July 4, 1939 |